United States Patent [19]
Dehn et al.

[11] Patent Number: 5,769,915
[45] Date of Patent: Jun. 23, 1998

[54] APPARATUS FOR CLEANING DUST-LADEN HOT GAS

[75] Inventors: Günther Dehn, Wesel; Horst Möllenhoff, Mülheim; Rüdiger Wegelin, Dortmund; Joachim Krein, Aach, all of Germany

[73] Assignee: LLB Lurgi Lentjes Babcock Energietechnik GmbH, Düsseldorf, Germany

[21] Appl. No.: 687,228

[22] Filed: Jul. 25, 1996

[30] Foreign Application Priority Data

Jul. 26, 1995 [DE] Germany .................. 195 27 311.7

[51] Int. Cl.⁶ .......................... B01D 46/04; B01D 46/02
[52] U.S. Cl. ........................... 55/424; 55/302; 55/523; 55/482; 55/484; 55/341.1
[58] Field of Search .................... 55/302, 293, 523, 55/341.1, 424, 466, 463, 425, 426, 324, 484, 485, 482; 95/280, 279; 210/323.2, 345

[56] References Cited

U.S. PATENT DOCUMENTS

| | | | |
|---|---|---|---|
| 4,525,184 | 6/1985 | Tassicker | 55/302 |
| 5,143,530 | 9/1992 | Haldipur et al. | 55/302 |
| 5,282,877 | 2/1994 | Unger et al. | 55/523 |
| 5,536,284 | 7/1996 | Puttaert | 55/302 |

FOREIGN PATENT DOCUMENTS

| | | | |
|---|---|---|---|
| 433637 | 6/1994 | Germany . | |
| 206550 | 12/1968 | U.S.S.R. | 55/324 |

Primary Examiner—Jay H. Woo
Assistant Examiner—Robert Hopkins
Attorney, Agent, or Firm—Max Fogiel

[57] ABSTRACT

In a process for the cleaning of dust laden, preferably hot gas with the aid of ceramic filter candles (6) which are open at one end stacked above one another in levels in a raw gas space, and connected to a clean gas space, these filter candles are cleaned by way of pulsed gas, which is blown for a short period of time from the side of the clean gas space and against the direction of gas flow into the filter candles. In the raw gas space the gas to be cleaned and the dust loosened by the cleaning are guided separately so that the loosened dust is guided to the dust removal structure of the raw gas space without once again mixing with the gas to be cleaned. The process is advantageously carried out in a filter housing (10) wherein the filter candles (6) are connected to laterally spaced apart supporting collectors (7). The filter candles (6) in one level are separated from the filter candles (6) in the level thereabove by an ash removal mantle (15). (FIG. 1)

7 Claims, 7 Drawing Sheets

APPARATUS FOR CLEANING DUST-LADEN HOT GAS

BACKGROUND OF THE INVENTION

The invention relates to a process and apparatus for the cleaning of dust laden, preferably hot gas by way of ceramic filter candles which are closed at one end.

A hot gas filter with ceramic filter candles is known from EP-PS 0 433 637, which stand on collector channels or are suspended therefrom. These collector channels are stacked spaced apart parallel in multiple layers within the filter housing. The collector channels open into a clean gas collector chamber which is formed in the filter housing and to which an exit flange is connected. The filter candles are periodically cleaned by way of pulsed gas. The dust which is thereby detached from the filter candles can admix with the raw gas proceeding to the filter candles in the lower levels and will once again deposit on the these filter candles. This redepositing of the dust and the thereby necessary double or tripple removal of the same dust significantly increases consumption of the pulsed gas which must be clean, possibly especially processed, but always compressed to high pressures.

In the hot gas filter known from EP-PS 0 129 053 the filter candles are suspended from multiple, stacked perforated plates which are respectively proceeded by a conical hood for the removal of the clean gas. The dust detached from the filter candles is intended to slide along the slope of the hood respectively below. However, in this arrangement the detached dust is also carried along by the raw gas because of turbulence below the perforated plates and can deposit once again on the filter candles of the lower levels.

SUMMARY OF THE INVENTION

It is an object of the invention to modify the conventional process or apparatus so that the detached dust can no longer repeatedly deposit on the filter candles.

The separation of the flow paths of the raw gas to be cleaned and the detached dust prevents that the already detached dust admixes with the raw gas and once again deposits on the filter candles. A repeated removal of the same dust, which would be associated with a higher consumption of pulsed gas, is thereby avoided. In a filter apparatus with multiple levels of stacked filter candles connected to individual supporting collectors this separation of the flow paths can be achieved by way of an ash drainage funnel.

BRIEF DESCRIPTION OF THE DRAWING

Several exemplary embodiments of the invention are illustated in the drawing and will be described in the following.

It shows.

DESCRIPTION OF THE PREFERRED EMBODIMENT

A preferably cylindrical, possibly pressurizable filter housing 10 closed by a cover 27 has in the cover a centrally positioned inlet conduit 1 for the raw gas to be cleaned. The interior of the filter housing 10 constitutes the raw gas space of the filter apparatus. The lower part of the filter housing 10 is shaped in the form of a funnel 16 which is provided with an exit conduit 17 for the removal of the detached dust. A distributor arrangement 2 with downwardly inclined deflector surfaces is positioned below the inlet conduit 1. The flow of raw gas which centrally enters through the inlet conduit 1is downwardly directed by the distributor arrangement 2 and transverse from the inside out to the filter candles 6.

The filter candles 6 are ceramic hollow bodies which are open at one end and which rest with their open end on straight supporting collectors 7. The supporting collectors 7 are spaced apart parallel and open into a clean gas collecting channel 8. The supporting collectors 7 and the clean gas collecting channel 8 together with the conduits connected in series thereto form the clean gas space of the filter apparatus. The clean gas collecting channel 8 and the supporting collectors 7 are positioned in the same plane. The filter candles 6 can also be provided with a flange surrounding the open end and suspended thereby from the supporting collectors 7.

Figure 1:
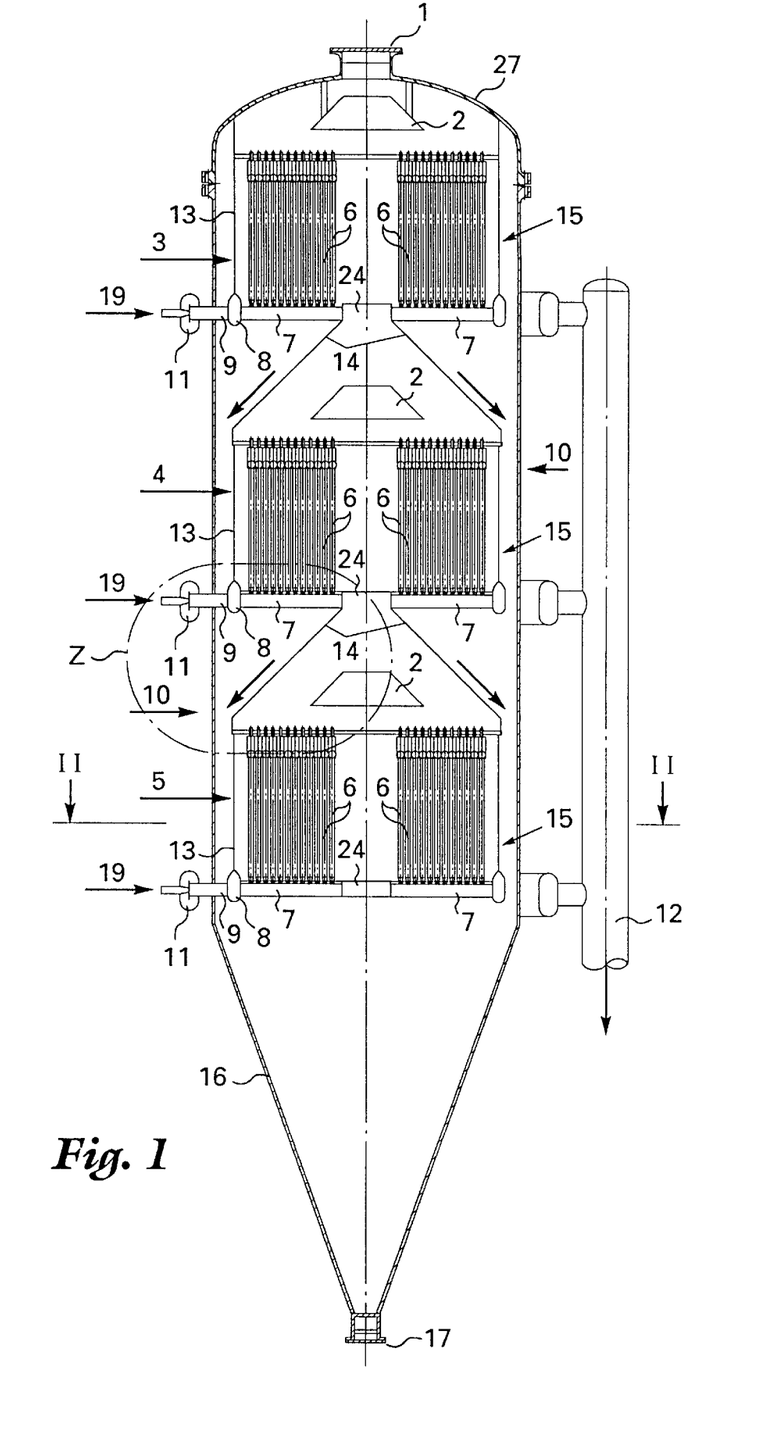
FIG. 1 the longitudinal section through an apparatus for the cleaning of gas.

The clean gas collector channels 8 with the associated supporting collectors 7 and the filter candles 6 connected thereto form a filter module. Several of these filter modules are stacked one above the other in the filter housing 10. FIG. I shows three of these filter modules, namely an upper filter module 3, a central filter module 4 and a lower filter module 5 which respectively form one level of the whole filter unit.

Figure 2:
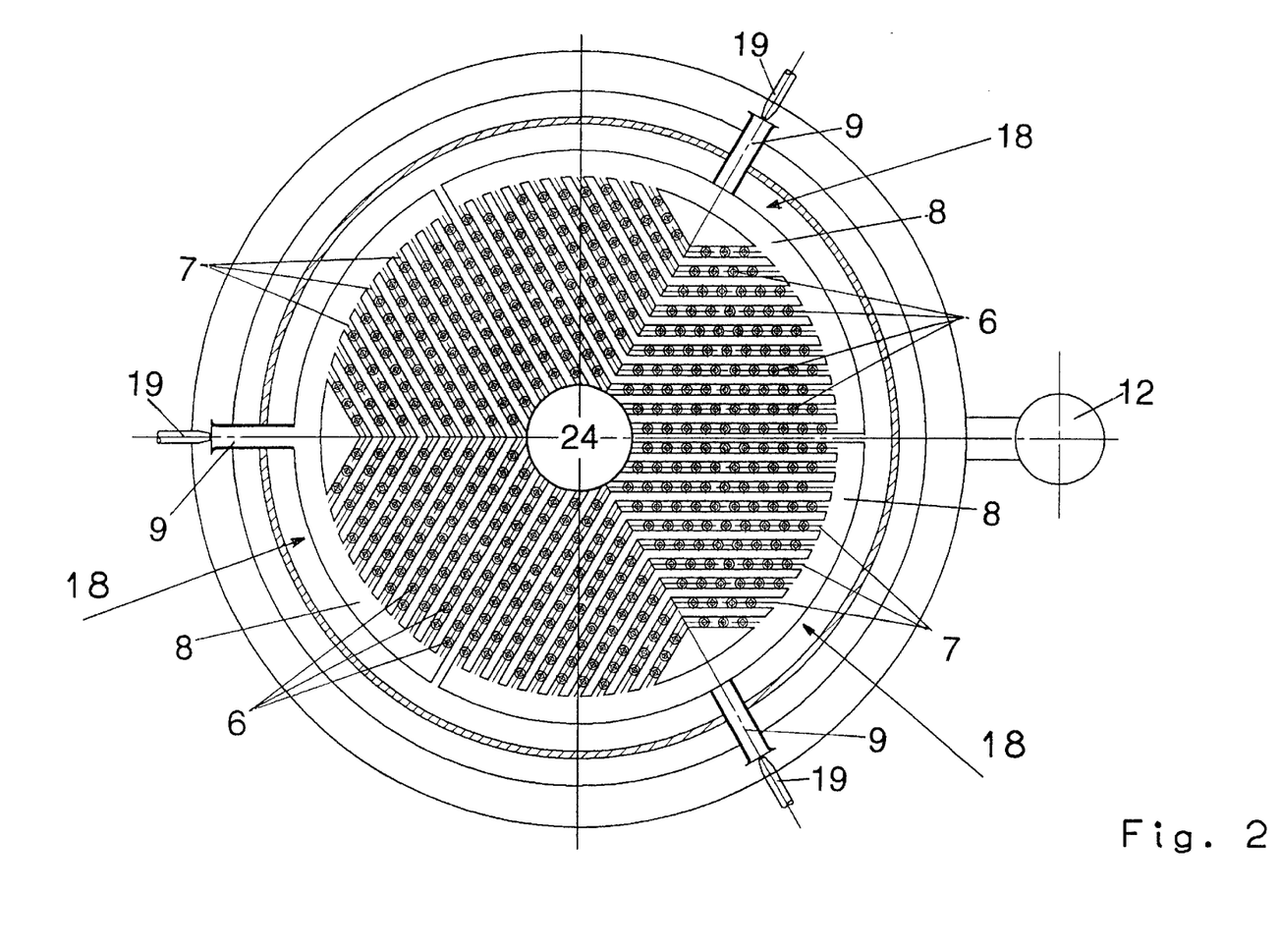
FIG. 2 the section II—II through FIG. 1.

Each filter module 3, 4, 5 is divided into several filter segments 18 in the shape of a circular sector which on the gas side are separated from one another. A free space remains in the center of each filter module 3, 4, 5 which is kept free by the supporting collectors 7 and forms a central opening 24. Six or more of those filter segments 18 can be provided which are of the same size. According to FIG. 2, the filter module 5 is divided into three filter segments 18.

The supporting collectors 7 of each filter segment 18 are connected with a separate clean gas collecting channel 8. The supporting collectors 7 are symmetrically positioned about an axis extending through the center of the filter segments 18. According to FIGS. 2 and 6, the clean gas collector channels 8 surround the supporting collectors 7 from the outside and are of annular shape. The supporting collectors 7 can thereby be positioned in the shape of a Vwith or parallel to the axis of symmetry. The annular clean gas collecting channels 8 are connected with a centrally positioned clean gas exhaust conduit 9 which is positioned in the axis of symmetry. This clean gas exhaust conduit 9 is guided through the wall of the filter housing 10 to the outside.

Figure 6:
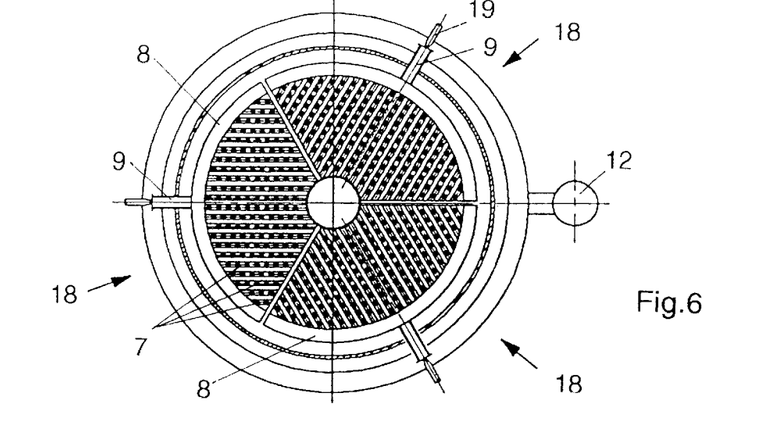
FIGS. 6–8 respectively the section II—II through FIG. I according to another embodiment, FIG. 9 the longitudinal section through another apparatus for cleaning gas, and FIG. 10 the longitudinal section through a further apparatus for cleaning gas.
Figure 7:
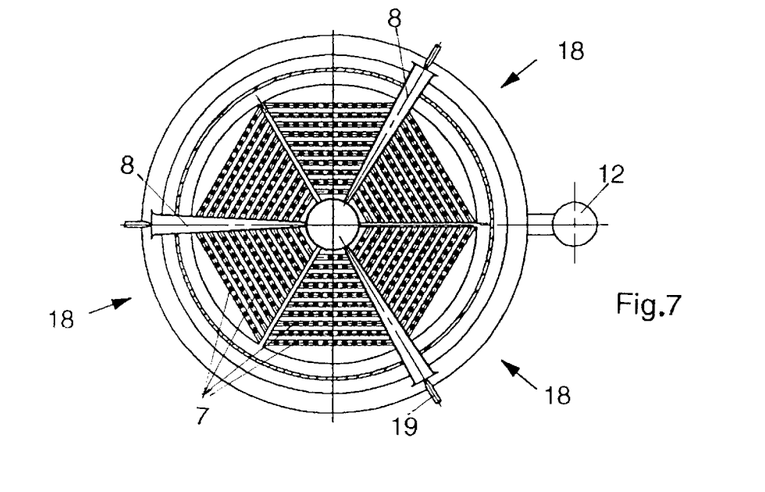

According to figs. 6 and 7 the clean gas collecting channels 8 are positioned along the axis of symmetry of the filter segment 18, whereby the supporting collectors 7 open from both sides into the clean gas collecting channel 8. Each of these clean gas collecting channels 8 is guided through the wall of the filter housing 10 to the outside. The flow-through cross-section of the clean gas collecting channels 8 increases in the direction of flow of the clean gas to the same extent as the flow volume increases. The increase in the flow-through cross-section can be achieved in the width or height direction of the respective clean gas collecting channel 8.

The clean gas exhaust conduits 9 (FIGS. 1, 2, 3, 6) which are guided to the outside, or the clean gas collecting channels 8 (FIGS. 7, 8) open into an annular clean gas collector 11 positioned at the same level outside the filter housing 10. The annular clean gas collectors 11 are connected to a common clean gas conduit 12.

A cleaning lance 19 is respectively directed into that end of each clean gas exhaust conduit 9 or clean gas collecting channel 8 which protrudes outward through the wall of the filter housing 10, through which lance a pulsed gas is blown in for the cleaning of the filter candles 6. Each filter segment 18 is individually cleaned.

Figure 5:
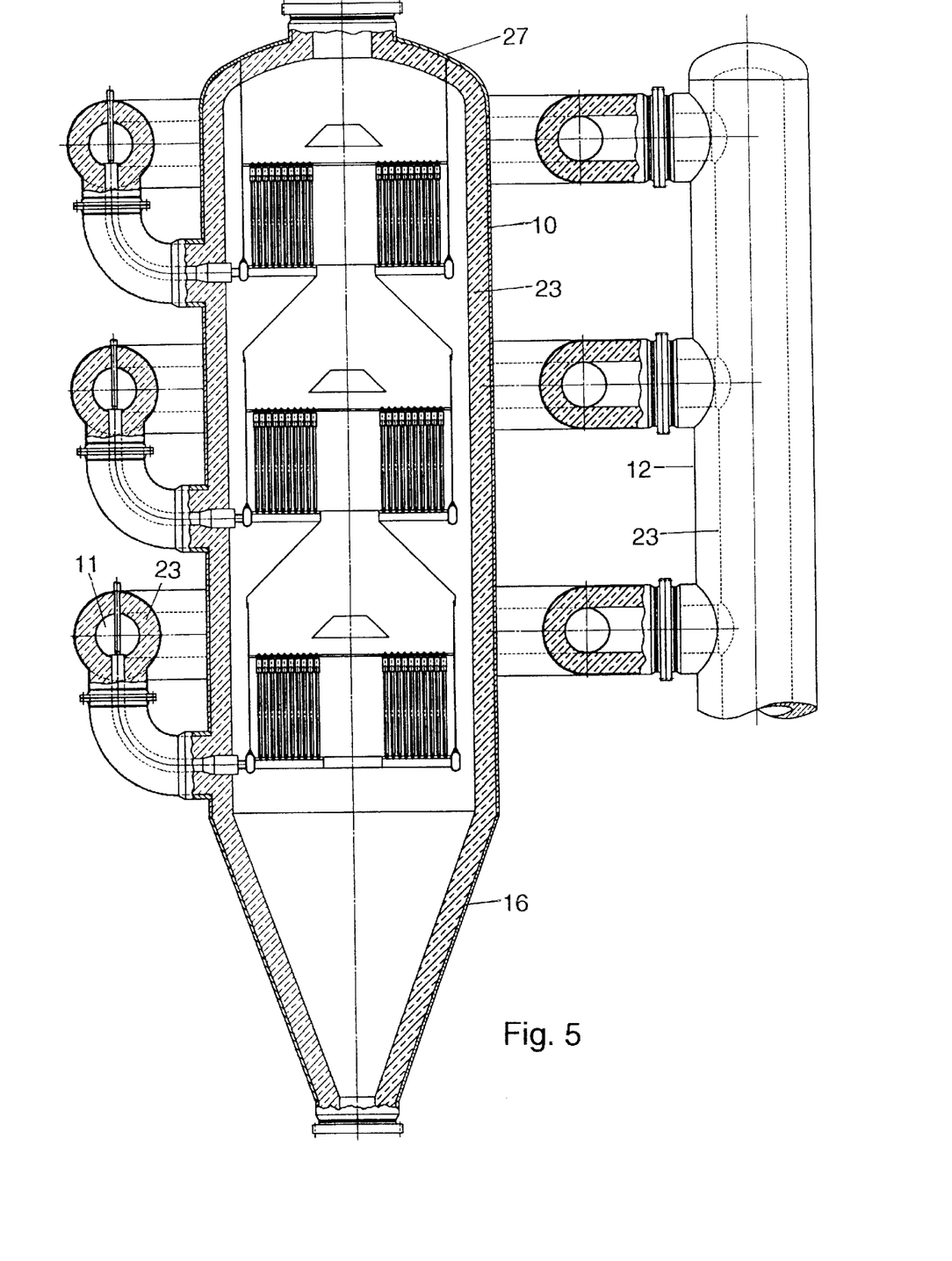
FIG. 5 the longitudinal section through another apparatus for cleaning gas.

As shown in FIG. 5, the wall, the cover 27 and the funnel 16 of the filter housing 10 as well as the annular clean gas collectors 11 and the clean gas conduit 12 on their inside can be provided with a fire proof coating 23.

Figure 3:
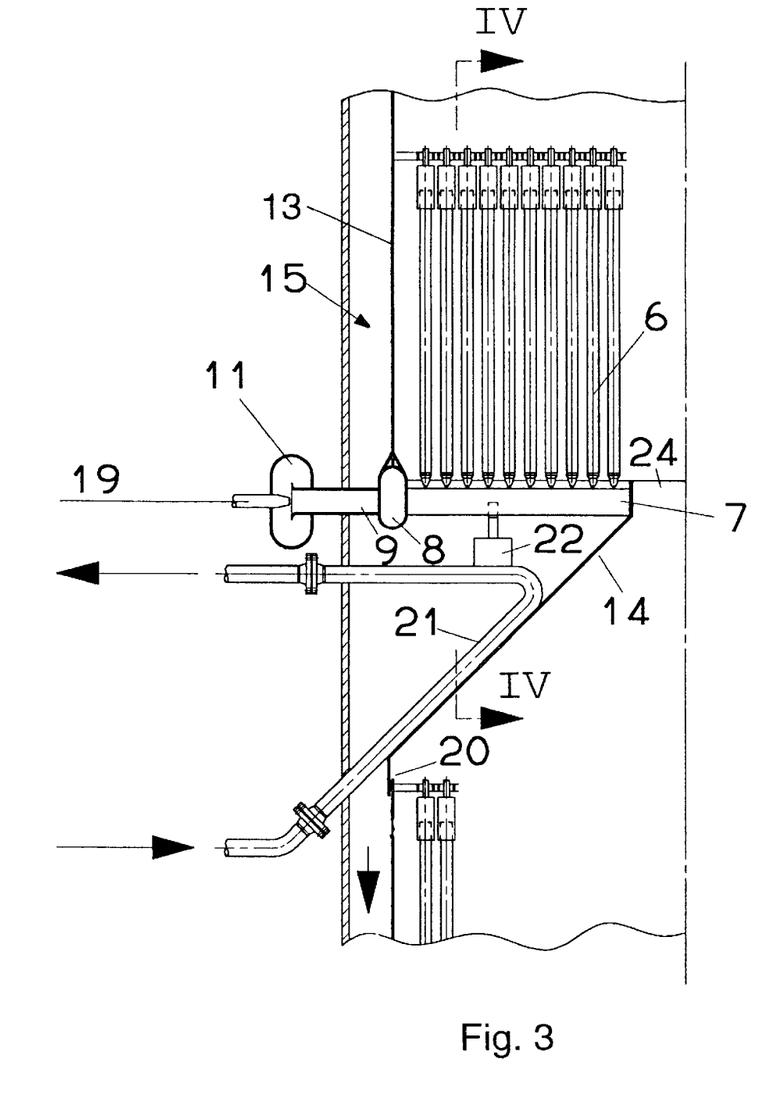
FIG. 3 the detail Z according to FIG. 1.
Figure 4:
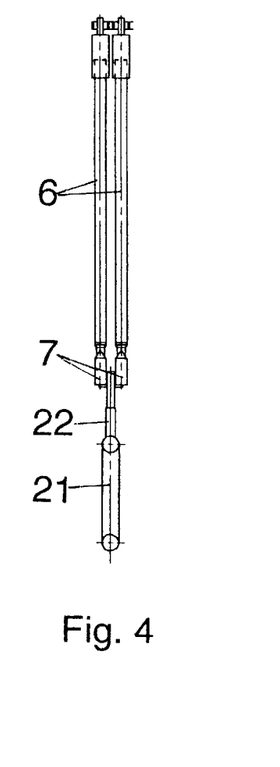
FIG. 4 the section IV—IV through FIG. 3.

Each filter segment 18 of each filter module 3, 4, 5 is supported on the wall of the filter housing 10 by way of one or more support structures. The support structure is a wall console which according to FIG. 3 is consists of one or more angled pipe elements 21. Especially when used as a hot gas filter, a cooling medium flows through the pipe elements 21. The support structure can also be provided with a double mantle for the cooling medium flowing therethrough.

A support 22 is provided on the pipe elements 21 of the support structure which consists of a vertical web which carries two lateral webs. The supporting collectors 7 of two adjacent filter segments 18 slidingly rest on the webs of this support 22. The fixed point of a filter segment 18 is located at the point where the respective clean gas exhaust conduit 9 or clean gas collecting channel 8 penetrates the filter housing. The individual filter segment 18 can thereby slidingly expand upon an increase in temperature on the supports 22 towards the housing center without the need for a special compensatory which can create problems at high temperatures or differential pressures. Thus, when the filter is operated with hot gases of up to 1000° C. the material expansion upon an increase in temperature affects only the individual filter element 18.

Figure 8:
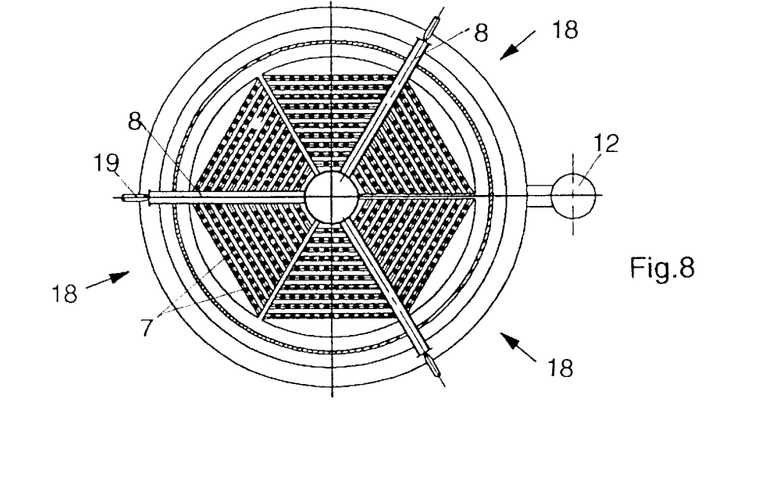

Each filter module 4, 5 is separated from the filter module 3, 4 thereabove by an ash removal mantle 1 5 made of sheet steel. The ash removal mantle 15 includes a cylindrical section 13 and a conical section 14 and bridges the interior of the filter housing 10 between two filter modules 3, 4, 5 located above one another. In the embodiment according to FIGS. 1 and 2 the cylindrical section 13 of the ash removal mantle 15 surrounds the filter candles 6 of the respective filter module 3, 4, 5 on the outside and extends at least to the upper edge of the filter candles 6. The lower edge of the ash removal mantle 15 is sealingly welded onto the clean gas collecting channel 8. If the supporting collectors 7 are positioned as shown in FIGS. 7 and 8, the cylindrical section 13 is connected to the outer supporting collectors 7. The conical section 14 tapers upwardly and merges with the opening 24 cleared from the supporting collectors 7 of the filter module 4, 3 thereabove. It is connected to the support structure formed by the pipe elements 21. The juncture 20 between the cylindrical section 13 and the conical section 14 is overlapped and slidably constructed as a sliding connection. The conical section 14 is omitted from the ash removal mantle 15 which surrounds the upper filter module 3. Instead, the cylindrical section 13 is connected at the upper edge with the cover 27 or the wall of the filter housing 10 and at that point or connection can be provided with a sliding connection.

The dust deposited on the filter candles 6 is periodically removed from the surface of the candles by way of pulsed gas which is injected through the cleaning lances 19 for a short period of time. The loosened dust is guided past the ash removal mantle 15 through the gap between the ash removal mantle 15 and the wall of the filter housing 10 and enters the funnel 16. The loosened dust thereby no longer comes into contact with the raw gas, since the latter flows along the interior of the ash removal mantle 15 to the filter candles 6 of the filter module 4, 5 respectively below. A mixing of already removed dust with the raw gas on its way to the filter candles 6 and a redepositing of the same dust is no longer possible. In this way a large amount of pulsed gas is saved which is required for the cleaning of the filter candles 6 and therefor must be clean, possibly especially processed, but always compressed to high pressures.

The annular gap for the dust removal between the wall of the filter housing 10 and the ash removal mantle 15 can be made small. The danger of bridging is reduced. The ash removal mantle 15 need only have a small wall thickness since the same pressure is present on both sides of the ash removal mantle 15.

Symmetrical flow characteristics of the raw gas stream are achieved, since the raw gas stream comes centrally from above and the clean gas is immediately removed at each level of the filter module 3, 4, 5. This leads to a relatively even loading of all filter candles 6 with dust and thereby to a further reduction in the pulse gas required for cleaning.

Figure 9:
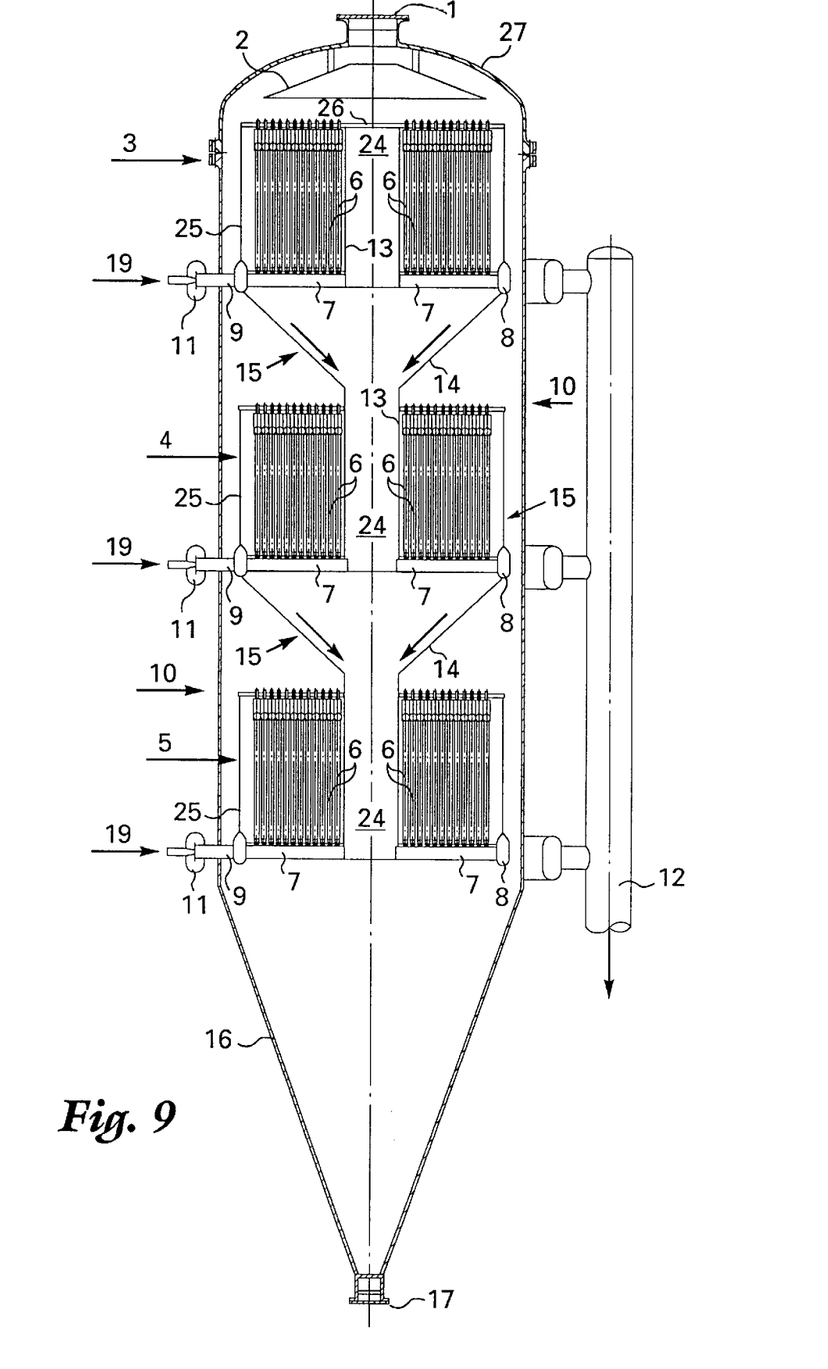

A variant of the ash removal mantle 15 is shown in FIG. 9. The cylindrical section 13 of the ash removal mantle 15 is therein positioned in the space spared from the supporting collectors 7 which forms the opening 24. The cylindrical section 13 inwardly borders the filter candles 6 of one filter module 3, 4, 5 and is connected with the supporting collectors 7. The conical section 14 which is directly adjacent the cylindrical section 13 opens upwardly and according to FIG. 9 is connected with the clean gas collecting channels 8 of the filter module 4, 5 positioned thereabove. The central, free space of the upper filter module 3 is closed by a plate 26. The filter candles 6 of each filter module 3, 4, 5 are outwardly surrounded by a guide mantle 25. The operation of this ash removal mantle 15 corresponds to the one of the aforedescribed ash removal mantle 15. The raw gas to be cleaned enters through the entry flange I and vertically impinges on the filter candles 6 of the upper filter module 3 from above. A further portion of the raw gas flows downward and between the ash removal mantle 15 and the wall of the filter housing 10 towards the filter modules 4,5 below. There the raw gas guided by the guide mantle 25 and the cylindrical section of the ash removal mantle 15 impinges vertically from above onto the filter candles of the respective filter module 4, 5. The dust loosened by the cleaning from the filter candles 6 is guided along the inside of the ash removal mantle 15 and past the filter candles 6 of the filter module 4, 5 below without coming into contact again with the raw gas.

Figure 10:
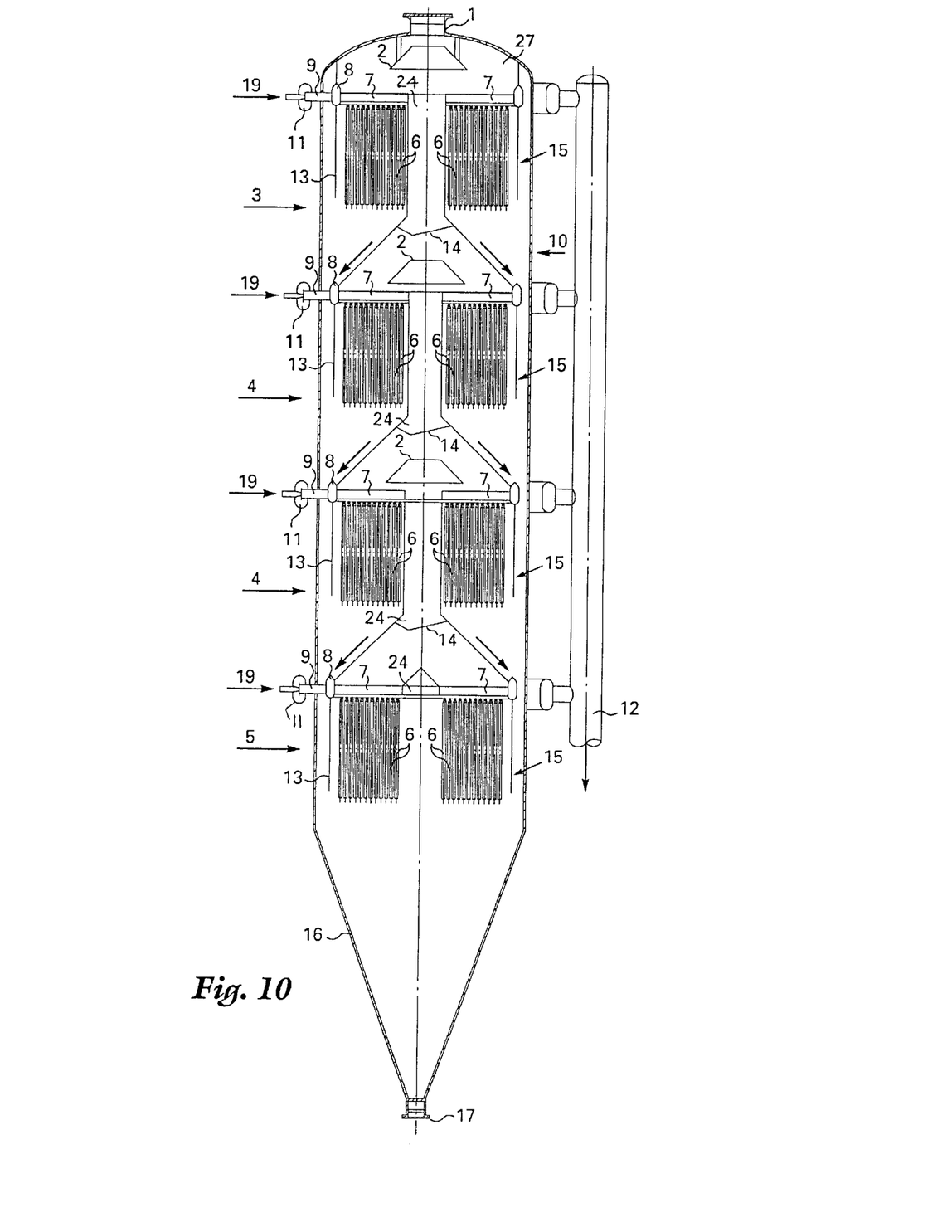

The process of the invention of separately guiding the loosened dust and the raw gas to be cleaned can also be carried out with the filter apparatus illustrated in FIG. 10. In that filter apparatus, the filter candles 6 are suspended from the supporting collectors 7. The ash removal mantle 15 which separates the filter candles 6 of one filter module from the filter candles 6 of a filter module thereabove consists of a cylindrical section 13 and a frustoconical, upwardly tapered section 14, which is connected to the respective clean gas collecting channel or channels 8. The filter apparatus shown in FIG. 10 furthermore has the peculiar feature that more than three filter modules are stacked one above the other. A solution for a filter arrangement is also conceivable wherein the supporting collectors which are stacked above one another and to which the filter candles are connected are together suspended or supported in the filter housing by way of supporting elements.

The embodiments of the invention in which an exclusive property or privilege is claimed are defined as follows:

1. Apparatus for cleaning dust-laden hot gas, comprising: a filter housing; ceramic filter candles closed at one end and stacked one above the other in a plurality of levels within said filter housing; supporting collectors spaced apart laterally and connected to said filter candles; each level having a center with a central space free of said supporting collectors; an ash removal mantle; filter candles in one level being separated from filter candles in another level above said one level by said ash removal mantle; said ash removal mantle having a cylindrical section and a conical section and extending from the supporting collectors of said one level to the supporting collectors of said other level, said ash removal mantle being connected to said one level and said other level for deflecting released dust out of the flow path of the gases to be cleaned, said flow path being directed toward the filter candles of said one level; said filter housing having an undivided interior space comprising an entrance chamber for gas to be cleaned and common to all levels.

2. Apparatus as defined in claim 1, wherein said cylindrical section of said ash removal mantle surrounds the filter candles of said one level on the outside; said conical section tapering upwardly and inwardly towards a central opening of said other level at said central space free of supporting collectors.

3. Apparatus as defined in claim 1, wherein said cylindrical section of said ash removal mantle surrounds the filter candles of said one level on the inside, said conical section widening upwardly and outwardly towards a periphery of the supporting collectors in said other level.

4. Apparatus as defined in claim 1, including a slidable connection for connecting said cylindrical section with said conical section of said ash removal mantle.

5. Apparatus as defined in claim 1, wherein said filter housing has a wall connected to the cylindrical section of an uppermost level.

6. Apparatus as defined in claim 1, including a cover for said filter housing and connected to the cylindrical section of an uppermost level.

7. Apparatus for cleaning dust-laden hot gas, comprising: a filter housing; ceramic filter candles closed at one end and stacked one above the other in a plurality of levels within said filter housing; supporting collectors spaced apart laterally and connected to said filter candles; each level having a center with a central space free of said supporting collectors; an ash removal mantle; filter candles in one level being separated from filter candles in another level above said one level by said ash removal mantle; said ash removal mantle having a cylindrical section and a conical section and extending from the supporting collectors of said one level to the supporting collectors of said other level, said ash removal mantle being connected to said one level and said other level for deflecting released dust out of the flow path of the gases to be cleaned, said flow path being directed toward the filter candles of said one level; said filter housing having an undivided interior space comprising an entrance chamber for gas to be cleaned and common to all levels; said cylindrical section of said ash removal mantle surrounding the filter candles of said one level on the outside; said conical section tapering upwardly and inwardly towards a central opening of said other level at said central space free of supporting collectors; a slidable connection for connecting said cylindrical section with said conical section of said ash removal mantle; said filter housing having a wall connected to the cylindrical section of an uppermost level; and a cover for said filter housing and connected to the cylindrical section of an uppermost level.

* * * * *